No. 795,014. PATENTED JULY 18, 1905.
R. WHITAKER.
REFRIGERATING APPARATUS.
APPLICATION FILED JAN. 11, 1904.
2 SHEETS—SHEET 2.
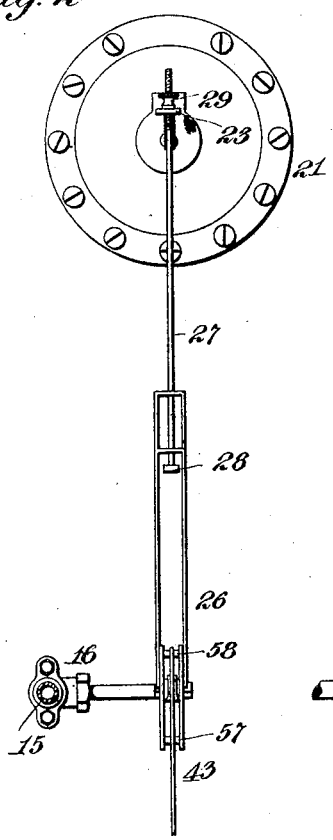
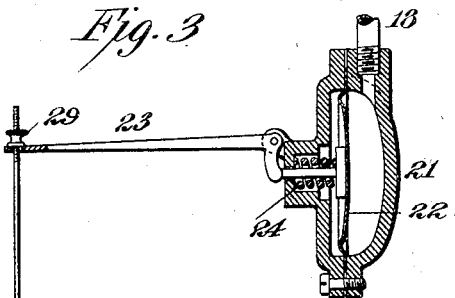
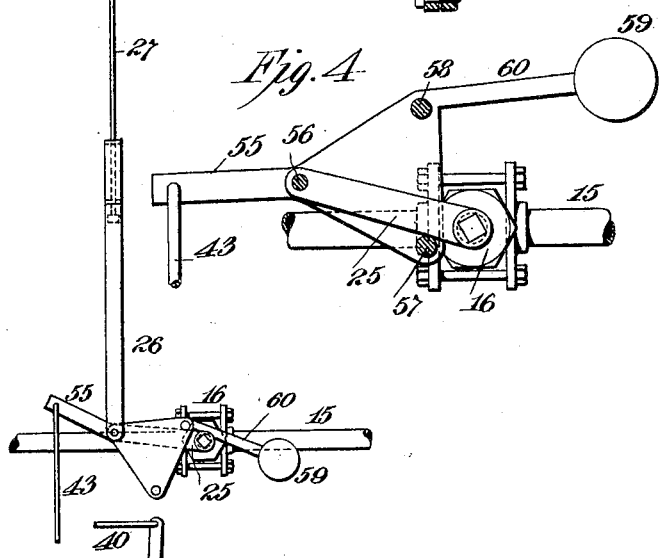
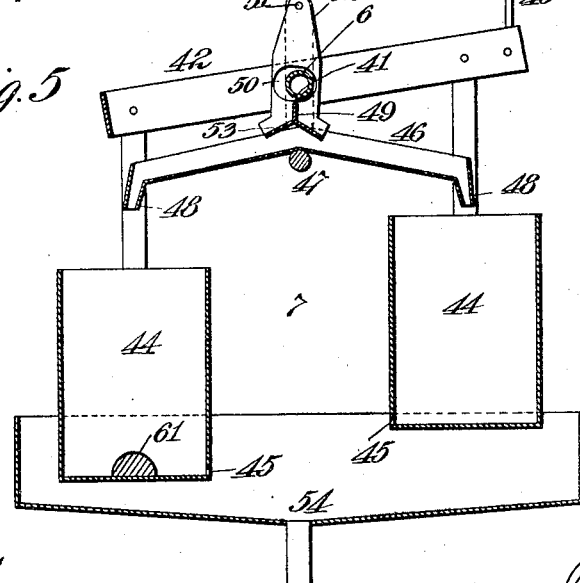
Witnesses:
Jas. F. Coleman
Jno. Robt Taylor
Inventor
Richard Whitaker
by Dyer & Dyer
Attorneys.

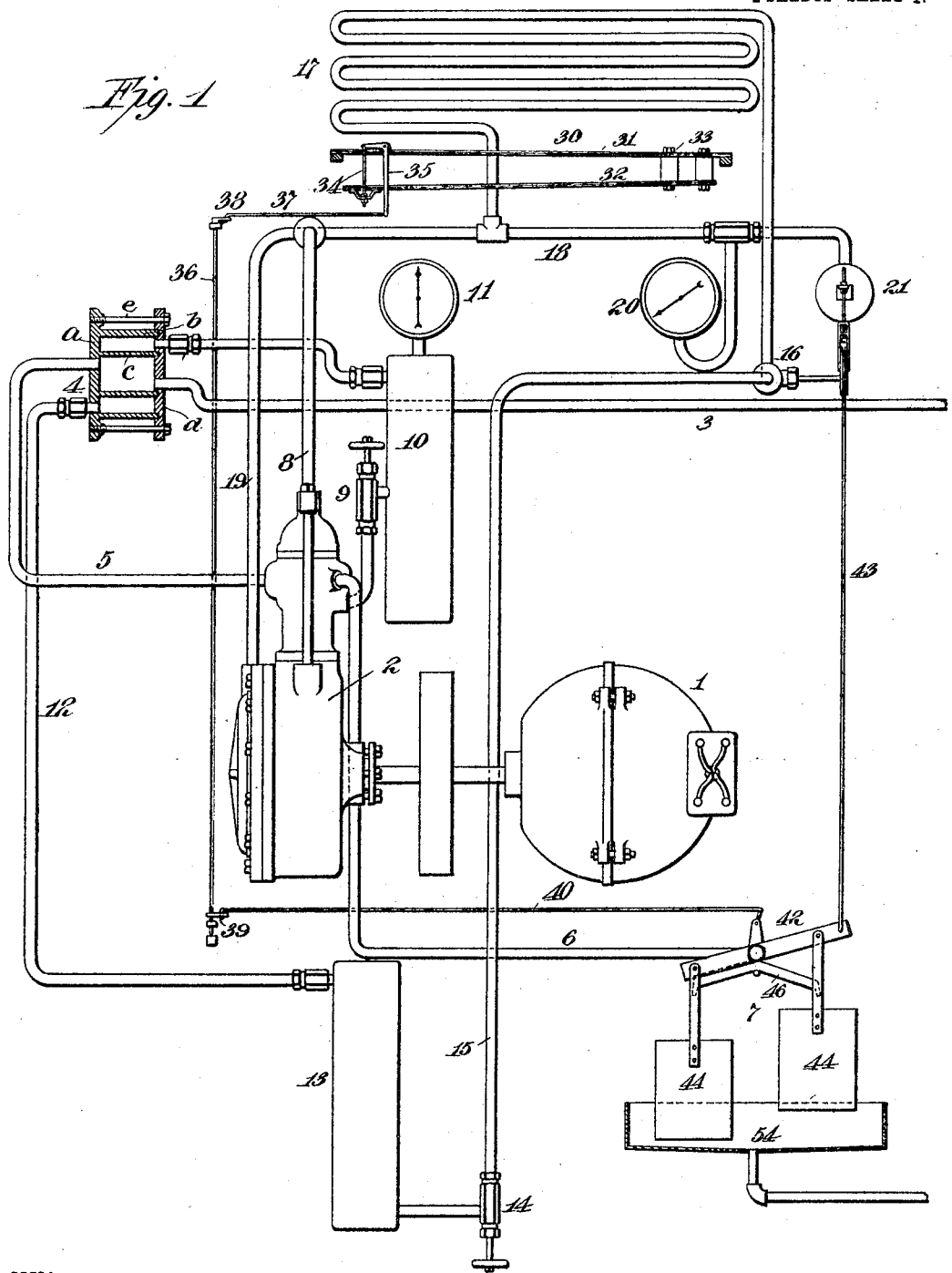

No. 795,014.

Patented July 18, 1905.

UNITED STATES PATENT OFFICE.

RICHARD WHITAKER, OF NEW BRUNSWICK, NEW JERSEY, ASSIGNOR OF TWO-THIRDS TO ROBERT W. JOHNSON AND JAMES W. JOHNSON, OF NEW BRUNSWICK, NEW JERSEY.

REFRIGERATING APPARATUS.

SPECIFICATION forming part of Letters Patent No. 795,014, dated July 18, 1905.

Application filed January 11, 1904. Serial No. 188,611.

*To all whom it may concern:*

Be it known that I, RICHARD WHITAKER, a citizen of the United States, residing in the city of New Brunswick, county of Middlesex, and State of New Jersey, have invented a certain new and useful Improvement in Refrigerating Apparatus, of which the following is a description.

The present invention relates to improvements in automatic refrigerating apparatuses which are operated by the compression and expansion of gas.

The object of the invention is to produce an apparatus which will be self-contained, which will be simple and inexpensive to build, and which may be run for considerable periods of time without any attention.

The invention is more particularly applicable to machines constituting simple isolated plants, and preferably is to be attached to the side of an ice-box or refrigerator; but the principle of the invention may be extended to machines of large size without departing from the spirit of the invention.

One embodiment of the invention comprises a pump actuated by any power and arranged to compress the ammonia-gas and allow it to expand in the coil in the cooling-chamber. The expansion-valve, which controls the temperature of the cooling-chamber, is actuated by the combined action of a diaphragm connected with the other end of the coil and working on the back pressure of the system and other positive means controlled by a thermostat. The movement of the thermostat is ordinarily so slight and it is so deficient in power that it cannot be used to directly actuate an expansion-valve. I use it, however, to control a constantly-running motor which has sufficient power to open or close the valve. This motor may be of any type; but I prefer to use one actuated by water-power and preferably operated by the same water system which is used to cool the compressed gas and the cylinder of the compressor. A system which is operated entirely by a thermostat is unsatisfactory, as it is operated entirely independent of the pressure within the system, which pressure might fall or rise or be increased above unsatisfactory limits irrespective of the temperature within the cooling-chamber. The system which is controlled entirely by the pressure in the system is equally unsatisfactory, as the temperature may rise within the chamber and cause the pressure to rise with it.

In order to better understand the nature of the invention, attention is directed to the accompanying drawings, which show one embodiment of the invention, and in which—

Figure 1 is a view made more or less diagrammatical and showing the complete system. Fig. 2 is an enlarged front view of the valve-controlling means. Fig. 3 is a side view of the same, showing the diaphragm and mechanism connected therewith in section. Fig. 4 is an enlarged view of the valve-operating mechanism, partially in section; and Fig. 5 is an enlarged sectional view of the water-motor.

In all of the several views like parts are designated by the same numerals of reference.

All of the mechanism shown in Fig. 1, with the exception of the thermostat and expansion-coils, is preferably arranged vertically upon the side of the cooling-chamber, the thermostat and expansion-coils being within the chamber. The mechanism consists of a motor 1, which is preferably an electrical motor coupled to a compressor 2. The compressor may be of any type, that shown being the same as described in my application for patent filed January 11, 1904, and numbered serially 188,612. The system of piping is in two parts—for ammonia and water. The circulation of water, which may be taken from any source of supply, enters by way of the pipe 3, passes through the center of the cooler 4, then through the pipe 5 to the water-jacket of the compressing-pump 2, through the pipe 6 to the water-motor 7, and from there away to waste. The ammonia-gas enters the compressing-pump at the top thereof through the pipe 8, is compressed, then passes through the valve 9, and enters the tank 10. This tank may be provided with a gage 11 for indicating the amount of pressure of the gas. The compressed gas passes from the tank 10 into the outer portion of the cooler 4, which cooler will be described in detail later on. From the cooler 4 the gas passes in a cold state through the pipe 12 into a tank 13 and then through a valve 14, a pipe 15, and the expansion-valve 16. From this point the expanded gas passes through the coil 17 within the cooling-chamber and returns through the pipe 18, which is connected with the original entering-pipe 8, thus completing the entire circuit. A supplemental pipe 19, connecting with the condensing-chamber of the compressor 2, returns any ammonia-gas which may leak by the packing-rings of the compressing-piston into the crank-case. The means by which this may be accomplished is disclosed in my copending application before referred to. A gage 20 indicates the amount of back pressure on the system.

Connecting with the pipe 18 is a chamber 21, which contains a diaphragm 22. This diaphragm actuates a bell-crank lever 23 against the tension of the coiled spring 24, and connection is made with the bell-crank lever 23 and the expansion-valve 16, so that the valve will be closed by an increasing back pressure in the pipe 18; but it will not be opened by a decrease in such pressure, the opening of the valve being accomplished by other means, which will be described.

Referring to Figs. 2, 3, and 4, the valve 16 is provided with an operating-arm 25, which is connected with the bell-crank lever 23 by a two-part rod, the lower part 26 being double and having bearings through which the upper part 27 passes. The upper part 27 has an enlarged head 28, which engages within a bearing of the part 26, so that when the part 27 is elevated it will take with it the part 26, but upon the part 27 being depressed it will not positively lower the part 26. The part 27 is connected to the bell-crank lever 23 by means of an adjustable screw-nut 29, so that the relation of the parts may be accurately adjusted.

The parts above described are so arranged that upon the back pressure in the pipe 18 being increased sufficiently to overcome the resistance of the spring 24 it will distort the diaphragm 22 sufficiently to elevate the bell-crank lever 23, and with it the two rods 27 and 26. This will lift up the valve-lever 25 and close the valve. This will prevent the admission of more expanded gas within the coils until the back pressure be reduced.

The thermostatic connection is as follows: The thermostat 30, which may be of any form, that shown consisting of the two arms 31 and 32, each formed of laminæ of materials of a different coefficient of expansion rigidly connected together at one end at 33 and at the other end by means of a link 34 and bell-crank 35, pivoted to one of the members 31.

By rigidly connecting the members 31 and 32 at one end and employing the bell-crank lever 35, having a short arm and a long arm for the connection of the other end, the expansion movements of the two parts are greatly multiplied through the moving parts of the system. Connection is made with the bell-crank lever 35 and a vertical shaft 36 by means of a link 37 and lever 38 at the top of the shaft 36. At the bottom of the shaft a second lever 39 and a link 40 make connection to the controlling element of the water-motor 7 and from this to the expansion-valve 16.

The water-motor is shown in Fig. 5 on an enlarged scale. The pipe 6, or a horizontal pipe in connection therewith, is closed at the end and is provided with an opening or openings 41 along the medial line of the bottom, so that the water which passes through the water system will be constantly discharged in a vertical direction downward. Supported in bearings upon the pipe 6, which serves as a pivot, is a lever 42, which by means of a link 43 connects with the controlling-lever 25 of the expansion-valve 16. This lever 42 is oscillated upon the pipe 6 by the proper mechanism. To each extremity of the lever 42 is a receptacle 44, each provided with a small orifice 45 near the bottom. Each of these orifices is smaller in area than the opening 41 within the pipe 6. Below the pipe 6 is a fixed trough or guideway 46, which may be carried upon a fixed support 47, and the extremities of this trough or guideway are provided with spouts 48, so that water may be directed into either of the receptacles 44. Below the opening 41 is mounted a guide 49 in the form of a vertical plate with a sharpened upper edge. This guide-plate 49 is carried by a plate 50, which is pivoted at 51 to a vertical support 52 and is connected to and oscillated by the link 40. Below the plate 49 are guide-plates 53. The plate 50 is provided with a slot surrounding the pipe 6, the slot being sufficiently elongated to permit the plate to be oscillated to some extent. The movement of the link 40, which, as before explained, is actuated by the movements of the thermostat, is to move the plate 50 one side or another, so as to divert the stream of water which passes through the opening 41. The water diverted one side or the other will flow through the appropriate spout 48 and will fill one or the other of the receptacles 44. As before explained, the orifices at the bottom of the receptacle are of smaller cross-sectional area than the opening 41, so that the desired receptacle will slowly fill with water. The overflow will pass into a pan or dish 54 and pass out into waste. The operation of this motor is as follows: Assuming the parts to be in the position shown in Fig. 5, with the upper end of the plate 50 moved to the right, the plate 49 will divert the stream of water which passes through the opening 41 to the right and cause it to pass into the receptacle 44. At the same time, assuming the receptacle at the left having been completely filled with water, the water will run out of that receptacle as water is being fed into the elevated receptacle at the right. As soon as the weight of the elevated receptacle overcomes that of the other it will descend, allowing the other receptacle to become elevated. This will not change the direction of flow of the stream of water, which will continue to flow into the receptacle to the right until by the action of the thermostat the plate 50 is moved to the other side, so as to divert the stream of water to the left and fill up the receptacle on that side. By appropriately apportioning the sizes of the receptacle 44 and the length of the lever 42 as much power as will be necessary to actuate the expansion-valve 16 which may ever be acquired will be secured. This motor is very efficient, and when the parts are properly proportioned it will effectively operate the expansion-valve.

The link 42, actuated by the water-motor, is not connected directly to the lever 25 of the expansion-valve, but through a second lever, so that it may actuate the expansion-valve when so permitted by the mechanism controlled by the diaphragm. Connections by means of which this is accomplished are best shown in Figs. 3 and 4. The link 43 is connected to the outer extremity of the lever 55, which is pivoted at 56 to the outer extremity of the lever 25. The lever 55 is preferably made in two parts and straddles the lever 25. The inner end of the lever 55 is enlarged, as shown, and the two parts are connected together by cross-bolts or rivets 57 and 58. These cross-bolts also serve as stops to limit the movement of the lever 55 and as abutments against which the lever 25 may be moved. A weight 59 on one extremity of the lever 55 and carried upon the end of an arm 60, formed integral with or connected rigidly to the lever 55, serves to depress the inner end of the lever when the parts are in such a position as to permit this being done. The operation of this portion of the device is as follows: As before described, the diaphragm 22 will positively close the valve 16 by elevating the lever 25; but owing to the loose connection of the two rod parts 26 and 27 the action of the diaphragm cannot open the valve. The opening of the valve when closed by the action of the diaphragm and the general control of the valve is secured by means of the water-motor 7, controlled by the thermostat. As shown in Fig. 3, the valve 16 is open, and in Fig. 4 the valve is closed, the lever 25 being elevated. In Fig. 4 the link 43 is in its lowermost position, the motor 7 being in the reversed position from that shown in Fig. 5 and the lever 25 being positively elevated by means of the mechanism actuated by the diaphragm. In this connection the pin 56 acts as a fixed fulcrum for the lever 55, causing the weight 59 to be elevated, it being understood that the weight is not sufficient to affect the action of the motor 7. When, owing to the decrease in pressure within the expansion-coil, the diaphragm 22 is no longer flexed, the two rod parts 26 and 27 will be lowered, permitting the lever 25 to be moved to the horizontal position by means of the action of the weight 59, the pivot to the link 43 serving as the fixed fulcrum, thus opening the valve 16. Should the water-motor change its position—i. e., should the buckets reverse their position to that shown in Fig. 5—the link 43 will be elevated. The pin or bolt 58 bearing upon the upper face of the lever will act as a firm support and will convert for the time being the outer portion of the lever 55 into an extension of the lever 25. The vertical movement of the link 43 will elevate both levers 55 and 25 sufficiently to close the expansion-valve 16. Should the water-motor again change its position, the link 43 will be lowered, and with it the levers 55 and 25. Any tendency of the latter to remain in the elevated position by the mere oscillation of the lever 55 will be checked by the action of the weight 59. It will thus be seen that the expansion-valve may be positively closed, but not opened, by the action of the diaphragm and that when closed by the action of the diaphragm it cannot be opened by the action of the thermostat; but when opened by the action of the thrust it may be closed or opened by the action of the thermostat alone. It is this combination with the thermostat for regulating the temperature and the diaphragm for preventing back pressure that I regard of particular value. The temperature ordinarily is to be regulated within 35° and 40° Fahrenheit with about twenty pounds back pressure as being the most advantageous combination. If the back pressure rises, owing to rising temperature or other causes, the efficiency falls and less cold will be produced. After a certain point were it not for the controlling mechanism actuated by the diaphragm the back pressure would rise to eighty or one hundred pounds and no cold at all would be produced. If reliance were had upon the thermostat solely, then it would be impossible to control the pressure, which would exceed desirable limits.

The cooler 4 (illustrated in Fig. 1) consists of a base $a$, having cast integral with it the concentric shells $b$ and $c$. The cover $d$ is secured in place by a number of bolts $e$, secured to the base $a$ and passing through openings near the periphery of the cover $d$. Suitable packing may be used to secure tight joints; but I prefer to provide circular countersunk grooves within the cover for engagement with the shells $b$ and $c$, the joints being ground. The shells $b$ and $c$ produce concentric chambers, the central one being circular and the outer one annular. The central chamber serves for the passage of the circulating water, while the outer one contains the ammonia-gas to be cooled. This cooler is very efficient and very cheap to manufacture. By using ground joints between the outer edges of the shells *b* and *c* and the cover *d* all packing may be dispensed with. By means of the valves 9 and 14 the system can be closed and the cooler and compressor taken apart for the purpose of inspection or repair.

In order that the supply of expanding gas within the expansion-coils may be automatically arrested in the event that the supply of cooling-water should cease from any cause, one of the receptacles 44 may be provided with a weight 61 sufficiently heavy so that when both receptacles are empty they will automatically assume the position shown in Fig. 5, elevate the rod 43, and close the expansion-valve 16.

Before claiming my invention I desire it understood that by the term "continuously-operating motor" I mean a motor such as I have described or any other form of motor which operates continuously or intermittently.

Having now described my invention, what I claim, and desire to secure by Letters Patent, is—

1. In a refrigerating apparatus, the combination with an expansion-valve, of a device moving by changes in back pressure within the system, connections between the device and the expansion-valve, for positively closing the valve, the said connections including a lost-motion connection, a device actuated by changes in temperature, connections between the device and the expansion-valve, for positively closing the valve when there is a fall in temperature, the said connections including a lost-motion connection so arranged that the valve may be opened solely by the combined effect of both devices, substantially as described.

2. In a refrigerating apparatus, the combination with an expansion-valve, the said valve being capable of occupying an open, a closed or intermediate position, of a device actuated by changes in back pressure within the system, connections between the device and the expansion-valve for positively closing the valve and limiting the amount of its open movement, the said connections including a lost-motion connection, a device actuated by changes in temperature, connections between this device and the expansion-valve, for positively closing the valve when there is a fall in temperature, the said connections including a lost-motion connection so arranged that the valve may be opened solely by the combined effect of both devices, and the extent of opening will be controlled by the device which is responsive to back pressure, substantially as described.

3. In a refrigerating apparatus, the combination with an expansion-valve, of a device moving by changes in back pressure within the system, connections between the device and the expansion-valve for positively closing the valve, the said connections including a lost-motion connection, a device actuated by changes in temperature, the said device comprising a thermostat and a water-motor, and connections between the thermostat and the controlling element of the water-motor, connections between this device and the expansion-valve, for positively closing the valve when there is a fall in temperature, the said connections including a lost-motion connection so arranged that the valve may be opened solely by the combined effect of both devices, substantially as described.

4. In a refrigerating apparatus, the combination with an expansion-valve, the said valve being capable of occupying an open, a closed or intermediate position, of a device actuated by changes in back pressure within the system, connections between the device and the expansion-valve, for positively closing the valve and limiting the amount of open movement, the said connections including a lost-motion connection, a device actuated by changes in temperature, the said device comprising a thermostat and a water-motor, and connections between the thermostat and the controlling element of the water-motor, connections between the device and the expansion-valve, for positively closing the valve when there is a fall in temperature, the said connections including a lost-motion connection so arranged that the valve may be opened solely by the combined effect of both devices, and the extent of opening will be controlled by the device which is responsive to back pressure, substantially as described.

5. In a refrigerating apparatus, the combination with an expansion-valve, and an operating-lever therefor, of a device responsive to back pressure within the system, lost-motion connections between this device and the operating-lever, a second lever pivoted to the operating-lever, a temperature-responsive device, connections between the temperature-responsive device and the second lever for moving the latter, and means to limit the movement of the second lever so that the valve will be actuated by the temperature-responsive device or the pressure-responsive device, or both, substantially as described.

6. In a refrigerating apparatus, the combination with an expansion-valve, and an operating-lever therefor, of a device responsive to back pressure within the system, a lost-motion connection between the device and the operating-lever, a second lever pivoted to the operating-lever, a temperature-responsive device, connections between this device and the second lever for moving the latter, an extension on the second lever, and stops to limit its movement, whereby the second lever may be oscillated to a certain extent without affecting the operating-lever, substantially as described.

7. In a refrigerating apparatus, the combination with an expansion-valve, and an operating-lever therefor, of a device responsive to back pressure within the system, a lost-motion connection between the device and the operating-lever, a second lever pivoted to the operating-lever, a temperature-responsive device, connections between this device and the second lever, for moving the latter, an extension on the second lever, and stops to limit its movement, whereby the second lever may be so oscillated to a certain extent without affecting the operating-lever, and a counterbalance on the extension, substantially as described.

8. In a refrigerating apparatus, the combination with an expansion-valve, and an operating-lever therefor, of a device responsive to back pressure within the system, a lost-motion connection between this device and the operating-lever, a second lever pivoted to the operating-lever, a temperature-responsive device, connections between this device and the second lever, for moving the latter, a plate on the second lever, stops carried by the plate, and engaging with the operating-lever to limit the movement of the second lever, whereby the lever may be operated to a certain extent without affecting the operating-lever, substantially as described.

9. In a refrigerating apparatus, the combination with an expansion-valve, and an operating-lever therefor, of a device responsive to back pressure within the system, a lost-motion connection between this device and the operating-lever, a second lever pivoted to the operating-lever, a temperature-responsive device, connections between this device and the second lever, for moving the latter, a plate on the second lever, stops carried by the plate, and engaging with the operating-lever to limit the movement of the second lever, whereby the lever may be operated to a certain extent without affecting the operating-lever, and a counterbalance on the plate, substantially as described.

10. In a refrigerating apparatus, the combination with an expansion-valve, of a valve-lever, direct connections thereto with a diaphragm, a second lever pivoted to the valve-lever, connections at one end of the second lever to means actuated by a change of temperature within the system, and a weight on the other end of the second lever, substantially as described.

11. The combination with an expansion-valve, of a valve-lever, direct connections thereto with a diaphragm, for moving the valve in one way only, a second lever pivoted to the valve-lever, connections at the free end of the lever with means actuated by a change in temperature within the system for moving the second lever, substantially as described.

12. In a refrigerating apparatus, the combination with an expansion-valve, of a valve-lever, direct connections thereto with a diaphragm, for moving the valve in one way only, a second lever pivoted to the valve-lever, means actuated by a change in temperature within the system connected at one end of the second lever, and a weight on the other end of the second lever, substantially as described.

13. In a refrigerating apparatus, the improved expansion-valve-actuating mechanism which comprises a diaphragm, a valve-lever, connections thereto to the diaphragm, a second lever pivoted thereon, the said lever being made in two parts straddling the valve-lever, with pins both below and above the valve-lever, and a weight upon one end of the second lever and connections at the other for operating the same, substantially as described.

This specification signed and witnessed this 5th day of January, 1904.

RICHARD WHITAKER.

Witnesses:
JNO. ROBT. TAYLOR,
JOHN L. LOTSCH.